Feb. 11, 1969
F. C. SPROUL
3,427,645
HOUSING DEVELOPMENT LAYOUT
Filed March 20, 1967
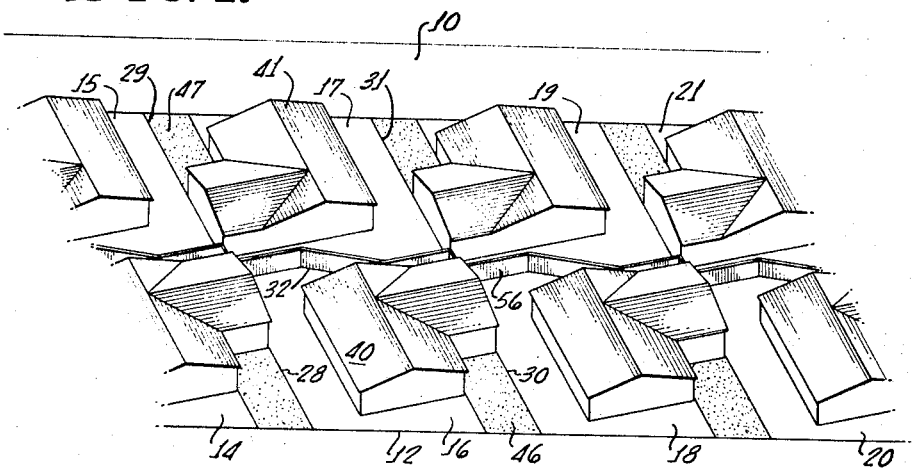
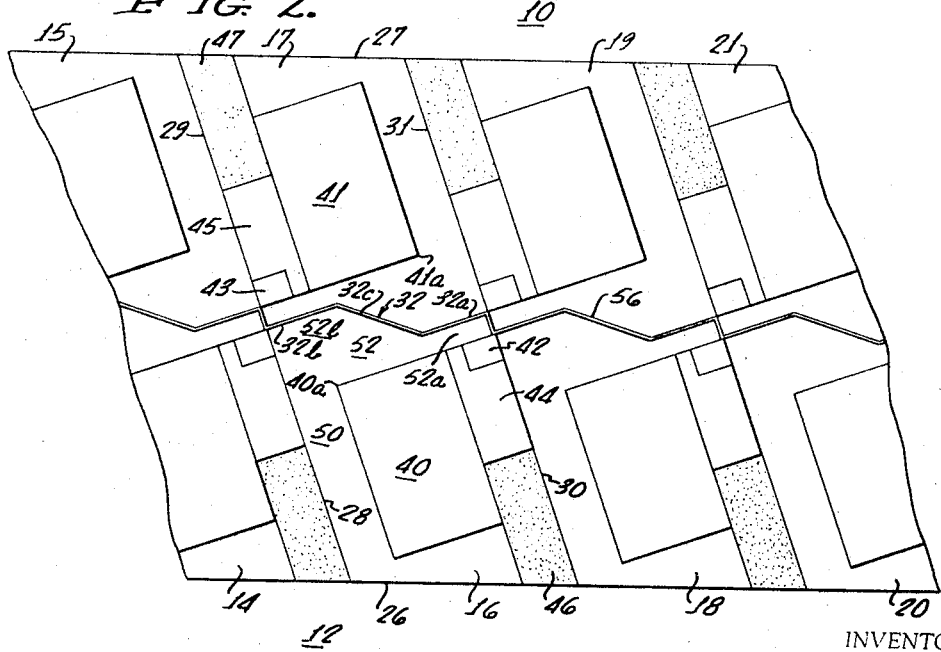
INVENTOR.
FRED C. SPROUL
BY
FOWLER, KNOBBE
& MARTENS
ATTORNEYS.

Feb. 11, 1969  F. C. SPROUL  3,427,645
HOUSING DEVELOPMENT LAYOUT
Filed March 20, 1967

INVENTOR.
FRED C. SPROUL
BY
FOWLER, KNOBBE
& MARTENS
ATTORNEYS.

United States Patent Office 3,427,645
Patented Feb. 11, 1969

3,427,645
HOUSING DEVELOPMENT LAYOUT
Fred C. Sproul, Anaheim, Calif.
(Box 1038, Oceanside, Calif. 92054)
Filed Mar. 20, 1967, Ser. No. 624,397
U.S. Cl. 52—169                                    10 Claims
Int. Cl. E04h 1/02; E01c 1/00

ABSTRACT OF THE DISCLOSURE

Small houses and lots are obliquely oriented with respect to streets in front of the houses. The rear lot boundary between two similar lots is arranged so that the house rear corner closest to the front street is spaced considerably from one end of the rear boundary while the other rear corner of the house is much closer to the other end of the rear boundary. Thus, each backyard has a shallow and a deep side.

Background of the invention

A need exists for better integrated housing developments having small single family houses located on small lots, preferably arranged in units of one hundred to four hundred. Such housing is of particular interest to retired couples on limited income in that privacy is attained at a reasonable purchase price and yet a small house and lot requires a minimum of maintenance work or expense. Also, in a homogeneous community with close proximity housing, the opportunities for socializing and developing friendships is enhanced. This, in turn, promotes a feeling of security in the development which is particularly important to elderly people.

Some of these features of low cost separate dwelling units are attained by living in parks for mobile homes or trailers which have become increasingly popular in recent years. However, there are several disadvantages of such parks and trailer homes. The space for parking a mobile home is usually only available by leasing on a short term basis. Mobile homes are generally not constructed nearly as well as permanent housing for the same price. Also, mobile homes have a high depreciation rate, and hence poor resale value. Consequently, this results in financing comparable to automobiles rather than the more favorable terms generally available for permanent housing.

In order to make a small lot, small house development feasible and practical, it is vital that the houses and lots be arranged to provide maximum space utilization, to decrease land lot costs and to minimize maintenance for the home owner. The cost aspect is particularly critical for making possible projects on high cost land in or near metropolitan areas at reasonable home prices. At the same time, it is desirable that the lots and houses be arranged to give a maximum of privacy while still providing a feeling of openness or spaciousness.

Summary of the invention

In accordance with the present invention, these features and benefits have been attained by employing several simple but unique techniques. The streets of the housing development layout are generally straight and arranged in parallel relation, while the boundaries of the lots positioned between the streets are obliquely oriented with respect to the streets. The houses are generally rectangular in shape with their side walls extending parallel to the lot side boundaries so that the houses are also obliquely oriented with respect to the streets. This creates a greater feeling of spaciousness when viewed from the street in that the front of the house and one side wall of the house is generally more exposed to view from the street than are houses perpendicularly arranged.

The rear boundary of one lot is contiguous with the rear boundary of a lot fronting on the next street. Due to the angular orientation of the house with respect to the street, one rear corner of the house is closer to the street than the other rear corner. To utilize this orientation to good advantage, the rear boundary of the lot is arranged so that one end of the boundary is located very close, preferably about five feet, to the corner of the house which is further from the front street while the other end of the boundary is spaced a considerable distance from the corner of the house which is close to the street. In the preferred arrangement, the rear boundary is irregularly formed with one end portion closely spaced and parallel to the house and with the other end portion parallel to but further spaced from the house. The result is that one side of the backyard is very shallow in depth while the other side of the backyard is relatively deep. The bordering rear house and lot have a similar complementary arrangement due to this angular orientation.

The virtue of this approach is of course that although the lots are very small, each lot is formed with a backyard portion which is adequate and convenient for a small private patio area. By contrast, if the rear boundary between the two lots were positioned in conventional fashion and located equidistant from the rear of the houses, the backyards would be considerably less handy and functional.

As an additional feature, each house is provided with a garage or carport located on one side of the house attached to the house and towards the rear wall of the house. By placing the garage on the side of the house which extends further from the street, the garage is less visible from the street due to the angular orientation of the house with respect to the street. All houses are conveniently designed for secondary entrance direct from garage or driveway. By locating the outer wall of the garage approximately on one side boundary of the lot and arranging adjacent houses in similar fashion, each home has essentially only one side yard to maintain, but yet maximum spacing between adjacent houses is obtained.

For a better understanding of the invention, refer now to the following detailed description and drawings, in which:

FIG. 1 is a perspective, somewhat schematic view of a portion of a housing layout illustrating the invention;

FIG. 2 is a schematic plan view of the layout of FIG. 1 showing the house and carport or garage arrangement; and, FIG. 3 is an enlarged plan view of a single lot and house of the layout of FIG. 2.

Figure 3:
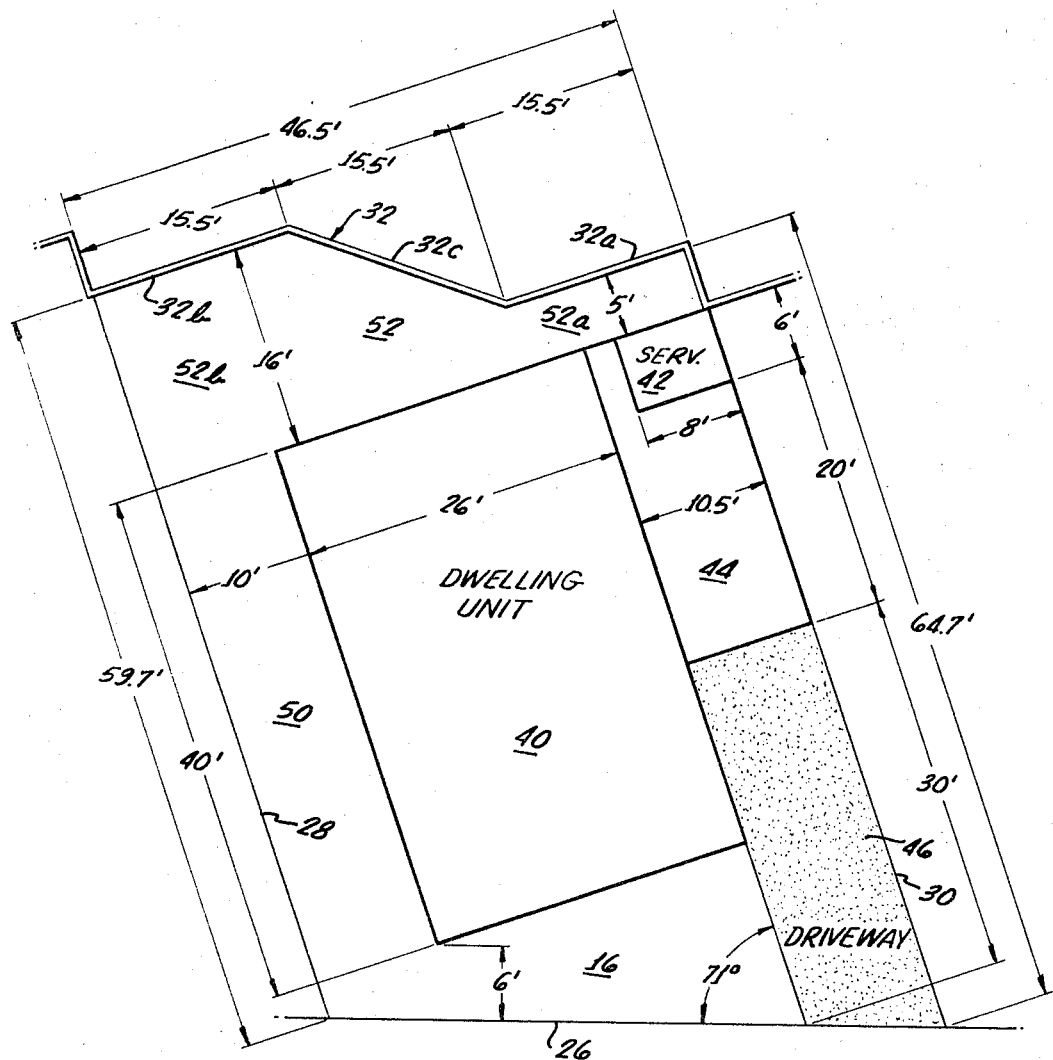

Referring to FIGS. 1 and 2, there is illustrated a pair of straight streets 10 and 12 arranged in spaced parallel relation. A group of homes are located between these streets and arranged in accordance with the teachings of this invention. It is contemplated that in the overall housing development of the type discussed herein, a number of homes of this nature will be clustered in blocks around a central park and community center. The number of homes on a block is variable to allow them to fit the existing space and to allow freedom of placement and arrangement of the houses.

While disclosure of the entire development is not necessary to understand this invention, and hence has not been illustrated, this community concept should nevertheless be kept in mind during the following description in order to more fully appreciate the invention. For example, the community center should have a minimum of 6,000 square feet or not less than 35 square feet per housing unit.

As can be seen, a series of lots 14, 16, 18 and 20 are arranged in side-by-side relation, fronting on the street 12. These lots are respectively aligned with similar lots 15, 17, 19 and 21 that front on the street 10. Since each lot is similarly shaped, only lots 16 and 17 will be identified and discussed in detail to illustrate the unique relationship of the houses, lots and streets. The lot 16 is formed with a front boundary 26 directly bordering the street 12, and with parallel side boundaries 28 and 30. A rear boundary 32 is contiguous with the rear boundary of lot 17. Similarly, the lot 17 is formed with a front boundary 27 and parallel side boundaries 29 and 31, which are aligned to form respective extensions of the side boundaries 28 and 30 for the lot 16.

Positioned on the lot 16 is a generally rectangularly shaped house 40 having attached to the rear of one side of the house a roofed structure including a service or storage area 42 and a vehicle storage area such as a garage or a carport 44 positioned forward from the area 42. A driveway 46 extends forwardly from the garage to the street. A house 41, storage area 43, garage 45, and driveway 47 are similarly located on lot 17.

As explained, the overall intent of the housing development is to provide compact houses on small lots arranged to obtain a maximum of space utilization with well defined lot lines. It is believed that with homes for two or three people, about the ideal size lot would preferably have less than 3,000 square feet and the living area of the house, or the house proper, would have approximately 1,000 square feet. While these figures are only illustrative, they are given to provide an appreciation for the compact nature of the development.

As one means to provide an appearance of spaciousness for these small homes, the lot side boundaries 28–31 are obliquely arranged with respect to the streets 10 and 12. Preferably, these side boundaries intersect the streets to form supplementary angles of 70° to 80° and 100° to 110°. In the arrangement illustrated, an angle of 71° is used. As seen, the houses are arranged with their side walls parallel to the side boundaries of the lots, with the result that the house is obliquely oriented with respect to the street. Consequently, the entire front wall of the house and one side of the house is visible from a considerably greater portion of the street than would exist if the house were arranged at right angles with respect to the street. In addition to giving a desirable impression of spaciousness, another benefit of this approach is that the side of the house exposed, as well as the front of the house, is conveniently available for use as a front entry to the home, giving greater latitude in designing entrance for pleasing architecture.

Observe that by positioning the garage 44 to the rear of the house on the side of the house which extends furthest from the street, the garage is less visible from the street due to the angular orientation of the house. Further, with the garage located as shown, the driveway 46 is relatively long and thus provides additional off street parking space on narrow streets for one or two cars or other vehicles. In this connection, it should be mentioned that it is contemplated that the streets 10 and 12 will only be wide enough to permit two lanes of traffic and will not provide for any street parking. Also, no sidewalks are employed, unless compelled to by city ordinances, so that pedestrians will utilize the streets. Speed limits will accordingly be maintained at a very low level. Additional off-street parking may be provided at various locations throughout the development if necessary.

It should be noted that in the preferred form of the invention the side of the garage remote from the house is common with the side boundary of the lot. Since each house is similarly arranged, the result is that each home has only one side yard thereby minimizing maintenance chores for the homeowner. Yet, maximum use of this area is attained with this uniform approach.

In accordance with the invention, the back boundary 32 for the lots 16 and 17 is oriented to provide the most desirable space utilization. The boundary 32 is preferably irregularly formed with one end portion 32a parallel to the straight rear walls of the houses and located very close to the service area 42 for the house 40 while being considerably spaced from the corner 41a of the house 41. The other end portion 32b of the rear boundary 32 provides the opposite situation by being oriented parallel to the rear of the houses but being offset with respect to the portion 32a. Portion 32b is spaced very close to the service area 43 for the house 41 while being considerably spaced from the corner 40a of the house 40. The rear boundary portions 32a and 32b are connected by an intermediate portion 32c which extends obliquely between the end portions 32a and b.

The result of this arrangement is that the backyard 52 for lot 16 is formed with one side or section 52a having a very shallow depth or distance between the rear of the house and the rear boundary 32. The other side 52b of the yard, at the opposite end of the boundary, is of considerably greater depth. Thus, the larger section 52b provides a very usable space for a private patio or other function. Also, the section 52b adjoins the side yard 50 so that these areas are jointly usable. It will be appreciated that the backyard space would be considerably less usable if the boundary were located midway between the rear of the houses 40 and 41. Also, the side yard space arrangement would be less usable if the house were centrally located on the lot.

It should be noted that the rear boundary extends in a manner to utilize the angular orientation of the houses. That is, the corner 40a of the house 40 which is closer to the street 12 than the other rear corner of the house is the side on which the boundary 32 extends furthest from the house 40. A corresponding situation exists of course for the house 41.

Note that the rear of the side boundary 30 for lot 16 also forms one side boundary for the backyard of lot 19. Similarly, the rear of the boundary 29 for the lot 17 forms one side boundary for the backyard of the lot 14. This occurs since the side boundaries for a given lot are unequal in length. As seen in FIGS. 2 and 3, the side boundary 28 for lot 16, which marks the edge of the deeper backyard section 52b, is shorter than the side boundary 30, which defines the edge of the shallower backyard section 52a. This arrangement of course can be varied, but it enhances the compactness of the layout.

To better appreciate the convenience of this arrangement, consider some of the other illustrative dimensions given for the lot 16 and house 40, in FIG. 3. Note that the 16 foot depth to the rear yard section 52b is more than three times the 5 foot depth of section 52a. Although various dimensions may be used, it is preferably that the depth of section 52b be at least twice that of section 52a. It can be seen that if the boundary 32 were placed midway between the houses, the resulting area would be much less usable than section 52b. By making the boundary sections 32a and b about equal, the lots 16 and 17 are formed with similar backyards. Five feet for the depth of the smaller backyard section is deemed to be about the desired dimension for adequate passage and movement of backyard equipment, etc.

The small size of the lot relative to the house should also be noted. The 40 foot depth or length of the house is more than twice the depth of section 52b of the rear yard. Similarly, the combined width of the house and garage is more than three times the 10 foot width of the side lot, and the house length is about two thirds of the average dimension of the lot side boundaries.

As can be seen from FIG. 1, the boundary 32 is conveniently marked by a suitable fence 56 to provide a degree of privacy. However, it is deemed desirable that in keeping with the spirit of the development, that this fence be only chest height, or approximately 4 feet. In other words, although some privacy is obtained "neighborliness" or socializing "over the back fence" is not impeded. Note that the fence extends to the side boundary for the backyard section which adjoins the adjacent backyard.

I claim:
1. An integrated housing development comprising the combination of:
  means defining a pair of generally straight streets arranged in parallel relation;
  means defining a plurality of similar lots having front, side and rear boundaries, the front of a first lot adjoining one of the streets and the front of a second lot adjoining the other street while the rear boundaries of said first and second lots are contiguous;
  a house positioned on each of said lots with each having front, rear and side walls, said side walls being substantially parallel to said lot side boundaries, said houses and lots being obliquely oriented with respect to said streets such that both the front wall of each house and one of the side walls are exposed to the street in front of the house, and such that a first rear corner of the house is further from the front street than the second rear corner of the house;
  said rear boundaries of said lots being irregular in form and including a first end portion parallel to the rear walls of said first and second houses, an opposite second end portion, offset with respect to the first end portion and arranged parallel to the rear walls of said first and second houses, and an intermediate portion connecting said end portions, said first end portion being closely spaced from said first rear corner of the house on said first lot and considerably spaced from the house on said second lot, said second end portion being closely spaced from the house on the second lot and considerably spaced from said second corner of said first house so that the side of the backyards for said houses adjoining the rear corner of the house closer to the street is of considerable greater depth than the other side of the backyards;
  a roofed structure extending along the side of each of said houses furthest from the street in front of the house and close to the rear lot boundary, the outer side of said roofed structure being contiguous with one side boundary of its lot so that each house has only one side yard, said roofed structure including car storage space; and
  a driveway extending forwardly from said car storage space to the street in front of the house.

2. The combination of claim 1, wherein said first and second lots are approximately the same width and the side boundaries of the first lot are approximately aligned with those of the second lot.

3. The combination of claim 1, including lots on each side of said first and second lots having a configuration similar to said first and second lots, and houses positioned on said side lots similar to said first and second houses and similarly oriented with their side walls parallel to the lot boundaries and the side walls of the adjacent houses.

4. The combination of claim 3, wherein the side boundaries of said lots and the side walls of said houses are oriented with respect to said streets to form an angle of approximately 70° to 80°.

5. The combination of claim 1, wherein the dimension between each house and the closest portion of its rear lot boundary is approximately five feet.

6. The combination of claim 1, including fence means defining said rear boundaries being approximately chest high for an average adult.

7. The combination of claim 1, wherein the area of practically all of said lots is less than approximately 3,000 square feet and the living area of said houses is approximately 1,000 square feet.

8. The combination of claim 1, wherein the depth of one side of said backyard is more than twice that of the other side of the backyard.

9. The combination of claim 5, wherein said first and second lots are approximately the same width and the side boundaries of the first lot are approximately aligned with those of the second lot, said first and second houses have straight rear walls, the deeper side of each of said backyards is from two to three times deeper than the shallower side, and said first and second end portions of said rear boundaries are approximately equal in length.

10. The combination of claim 1 wherein said roofed structure includes a service area at the rear portion thereof and a car storage space at the forward portion thereof.

No references cited.

EUGENE R. CAPOZIO, *Primary Examiner.*
HARLAND S. SKOGQUIST, *Assistant Examiner.*

U.S. Cl. X.R.
94—1

Disclaimer

3,427,645.—*Fred C. Sproul*, Anaheim, Calif. HOUSING DEVELOPMENT LAYOUT. Patent dated Feb. 11, 1969. Disclaimer filed Jan. 21, 1969, by the inventor.

Hereby disclaims the terminal portion of the term of the patent subsequent to Aug. 6, 1982.

[*Official Gazette May 6, 1969.*]